Jan. 14, 1958 R. D. FALLON ET AL 2,819,780

LINKS FOR FABRICATING FLEXIBLE AMMUNITION CHUTES

Filed Nov. 18, 1955 4 Sheets-Sheet 1

INVENTORS.
RAYMOND D. FALLON,
HARRY E. ELLIOTT,
LESLIE K. LOEHR.

Leslie K. Loehr

AGENT.

Jan. 14, 1958 R. D. FALLON ET AL 2,819,780

LINKS FOR FABRICATING FLEXIBLE AMMUNITION CHUTES

Filed Nov. 18, 1955 4 Sheets-Sheet 2

INVENTORS.
RAYMOND D. FALLON,
HARRY E. ELLIOTT,
LESLIE K. LOEHR.
Leslie K. Loehr
AGENT.

INVENTORS,
RAYMOND D. FALLON,
HARRY E. ELLIOTT,
LESLIE K. LOEHR.
Leslie K. Loehr
AGENT.

INVENTORS.
RAYMOND D. FALLON,
HARRY E. ELLIOTT,
LESLIE K. LOEHR.
Leslie K. Loehr
AGENT.

United States Patent Office 2,819,780

Patented Jan. 14, 1958

2,819,780

LINKS FOR FABRICATING FLEXIBLE AMMUNITION CHUTES

Raymond D. Fallon, Venice, and Harry E. Elliott and Leslie K. Loehr, Los Angeles, Calif., assignors to Hughes Tool Company, Aircraft Division, Houston, Tex., a corporation of Delaware Application November 18, 1955, Serial No. 547,685

12 Claims. (Cl. 193—25)

This invention relates to flexible chutes of the character especially adapted for guiding rounds of ammunition arranged in belt formation, and more particularly to new and improved sections or links adapted for connection in multiples to form such flexible chutes.

It has become accepted practice in the use of automatic guns to assemble cartridges or rounds of ammunition in such a manner as to form an ammunition belt, of any desired length, having flexibility in all directions, and to provide a flexible chute for guiding the movement of such a belt from a storage compartment to a gun. Generally speaking, such flexible chutes are of the type shown and described in U. S. Patents No. 2,477,264, granted July 26, 1949 to C. B. Pearson et al., and No. 2,488,679, granted November 22, 1949 to W. H. Nobles.

Flexible chutes of the type disclosed in the above-identified patents are characterized by a plurality of transversely open unitary sections or links which are flexibly interconnected side-by-side to outline a belt-guiding passageway. Each unitary section includes a frame having a pair of U-shaped portions with legs interconnected such that the open ends of the U-shaped portions face each other, and such that each U-shaped portion is permitted to twist or turn with respect to the other about an axis associated with the interconnected legs. Each U-shaped portion is provided with permanently attached connectors for expansively connecting the unitary sections in tandem, and with permanently attached elements adapted to form imbricated guiding surfaces for guiding an ammunition belt when a series of such unitary sections are connected in chute-forming relationship. The flexible features of these chutes are functions of the amount of expansion and contraction allowed by the connectors between adjacent unitary sections and the amount of twist or turn allowed by the interconnection between the U-shaped portions of the frame.

Although prior flexible chutes of the above character satisfactorily perform their intended function, they are expensive to manufacture and difficult to repair or alter at the point of use; therefore, one purpose of the present invention is to provide a unitary structure which when coupled in multiples, forms a flexible ammunition chute that is not only simple and inexpensive to manufacture, but is easily repaired and/or altered to suit requirements at the place of use. The unitary structure contemplated by this invention comprises an improved frame with opposed U-shaped end portions, a novel medial portion interconnecting the end portions, and novel connectors removably attached thereto for coupling frames in multiple to form a flexible chute having a belt-guiding passageway, said connectors including means adapted to form imbricated or overlapped guiding surfaces lengthwise of the passageway for guiding an ammunition belt.

Accordingly, it is an object of this invention to provide a chute-forming section or link having opposed U-shaped elements interconnected by a member having torsional resilience to permit relative movement between the U-shaped elements about the axis of the interconnecting torsion member.

It is also an object to provide such a chute-forming link in which the torsion member, having its ends secured to the U-shaped elements, is formed independently of these elements so that it may be constructed of suitable material and/or receive special treatment to provide a selection in the amount of resiliency afforded to the relative movement between the U-shaped elements about the axis of the torsion member.

It is a further object to provide a chute-forming link of the above character in which the U-shaped elements are provided with removable connectors adapted for flexibly connecting the links in tandem, and to provide imbricate surface-forming elements associated with the connectors and adapted to form the guiding surfaces of an ammunition guiding passageway.

It is an additional object to provide such links in which the connectors are easily attached to the U-shaped portions of the links, and detached therefrom, by a simple manual operation capable of being performed without the aid of special tools or equipment.

It is another object to provide a flexible chute constructed of a plurality of identical chute-forming links each having a frame with U-shaped end portions interconnected in spaced and normally coplanar relationship such as to permit a limited degree of relative angular displacement of the end portions without distorting the same when twisting forces are applied thereto, and such that the end portions automatically return to their normal coplanar relationship when the twisting forces are discontinued.

It is a further object to provide a chute-forming link of the above character, which is inexpensive to produce and is particularly adapted for manufacture with modern mass production methods.

It is also an object to provide a chute-forming link constructed of component elements which are particularly adapted for either right or left hand assembly to provide ammunition chutes conditioned for feeding guns from either the right or left hand side according to requirements of the gun installation.

The novel features of this invention, together with further objects and advantages thereof, will be better understood from the following description considered in connection with the accompanying drawings. It is expressly understood, however, that the drawings are for the purpose of illustration and description only, and are not intended as a definition of the limits of the invention.

Figure 21:
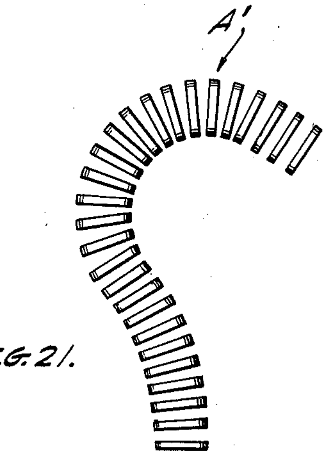
Figs. 20, 21 and 22 are schematic representations of flexible ammunition chutes in distorted conditions.
Figure 20:
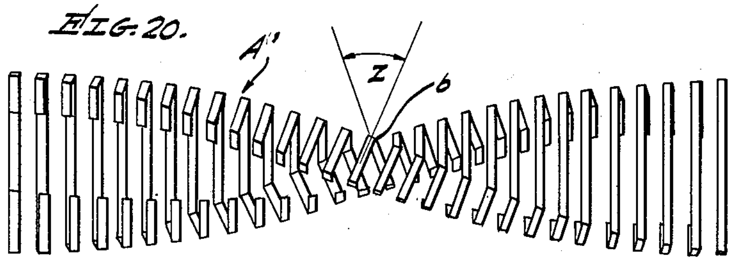
Figure 22:
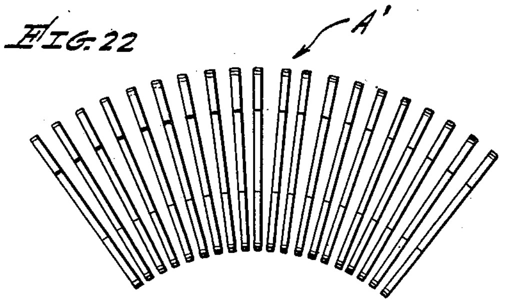

The importance of the present invention will be more fully understood by describing some of the essential features required in an ammunition chute; hence, reference is first made to Figs. 20, 21 and 22 which are presented as examples of the three types of bending to which such a chute, schematically shown and designated by reference character A', may be subjected when used to provide a passageway for guiding ammunition belts.

In general, it has become an accepted practice, well known in the art, to assemble ammunition in link-type belts wherein each successive round acts as a pin interconnecting adjacent links. The links of such a belt, arranged to permit removal of the rounds at right angles to the plane of the belt, are constructed to allow a limited amount of relative movement between adjacent rounds to provide the belt with limited flexibility in the several directions suggested by the curved and twisted shapes of chute A' shown in Figs. 20, 21 and 22.

In view of the aforesaid limitations in belt flexibility, an ammuniiton chute should have sufficient adaptability to form a passageway in which the twists and/or turns may approach but cannot exceed the twist and turn limitations of the belt to thereby permit the belt to move through the curved or twisted portion of the chute without jamming. Furthermore, the allowable twists and curves of the chute should not decrease the cross sectional area of the passageway to an extent such as would impede the progress of the belt; also, the guide surfaces extending longitudinally through the passageway should offer an absolute minimum of resistance to belt movement; hence, it is to obtain an ammunition chute having these essential features that the chute-forming link of the present invention was devised.

Figure 1:
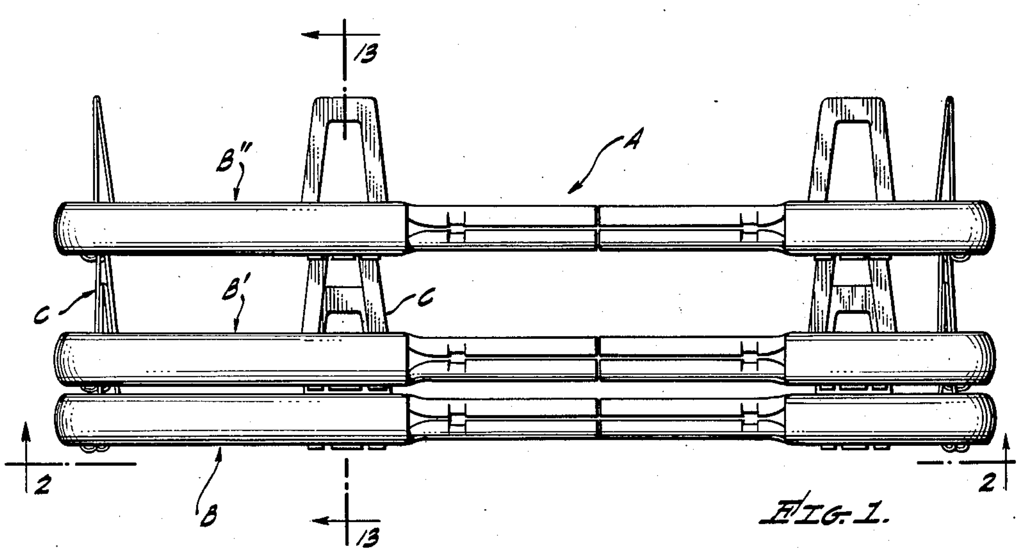
Fig. 1 is a plan view of a flexible feed chute embodying the improved link of this invention.

Referring now to Fig. 1, the flexible ammunition feed chute, illustrated therein and generally designated by reference character A, includes identical chute-forming sections or links B, B', and B'' interconnected in tandem relationship. As shown, the links, placed side-by-side, are coupled to each other with connectors C, made of bendable resilient material and hereinafter described, which function to permit a limited amount of separation varying from a minimum, as indicated by the relative position of link B with respect to link B', to a maximum, as indicated by the relative position of link B' with respect to link B''.

Figure 2:
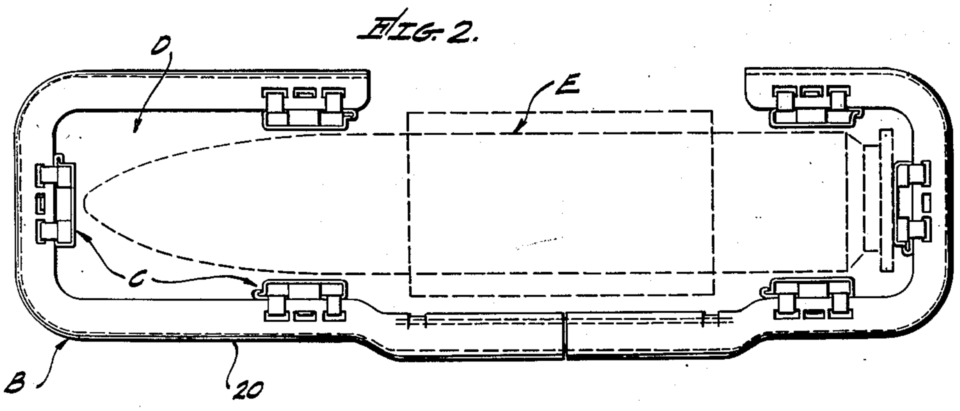
Fig. 2 is an end view of the chute taken along line 2—2 of Fig. 1 showing a side elevation of the improved link and a cross section of the chute passageway.

Each of the links B includes a frame 20 shaped to define the general cross sectional configuration of a passageway D suitable for guiding a belt of ammunition comprising cartridges of the character of cartridge E shown by dotted lines in Fig. 2.

Figure 3:
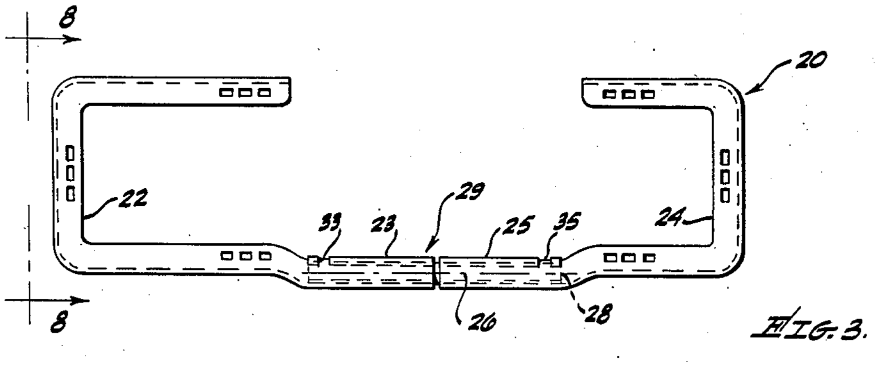
Fig. 3 is a side view of the frame of the improved link showing the medial and U-shaped end portions.

Frame 20, illustrated in Fig. 3, is provided with U-shaped end portions 22 and 24 having, respectively, extended tubular legs 23 and 25 which are interconnected along a common axis 26 by a torsion element 28 positioned within the tubular legs such that element 28 and legs 23 and 25 constitute the medial portion 29 of the frame. In order to provide rigid and light-weight structure, U-shaped end portions 22 and 24 are made of relatively thin material formed into channel-shaped cross sections wherein the flanges of the channel extend inwardly toward the passageway. The tubular configuration of each of the extended legs 23 and 25 is formed by curling the flanges and web of each leg into a straight cylindrical tube clearly shown by the views in Figs. 4, 5 and 6.

Figure 7:
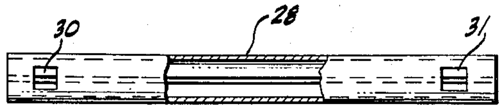
Fig. 7 is a view partially in plan and partially in section of the torsion element.

Torsion element 28, illustrated by itself in Fig. 7, is an elongated circular tube having a longitudinally split or severed wall made of resilient material, such as tempered spring steel. The importance of this construction resides in the fact that element 28 is provided with the characteristics of a torsion spring which is capable of torsional deformation about its longitudinal axis while maintaining substantial rigidity with respect to forces applied transversely of this axis; that is to say, the application of relatively small twisting forces to the ends of the split tube comprising element 28 will cause considerable angular displacement of these ends about the tube axis, yet the tube will be extremely rigid to bending forces applied transversely of the axis.

Figure 4:
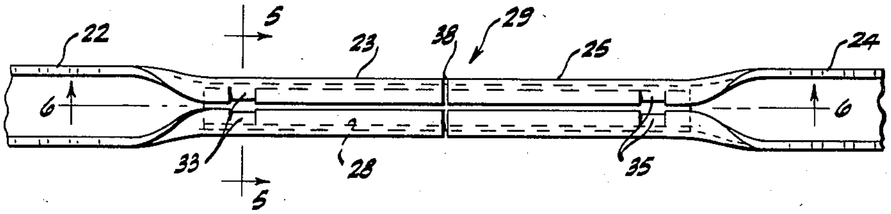
Fig. 4 is an enlarged view of the medial portion of the frame.
Figure 6:
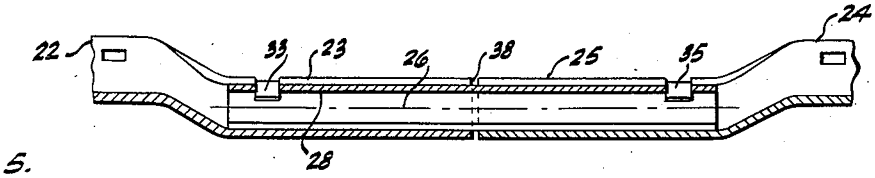
Fig. 6 is a sectional view taken on line 6—6 of Fig. 4.
Figure 5:
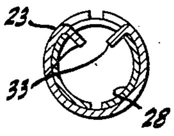
Fig. 5 is a sectional view taken on line 5—5 of Fig. 4.

In order to secure the ends of torsion element 28 within the bores or sockets of extended tubular legs 23 and 25, apertures 30 and 31 are provided at the ends of the split tube opposite the split in the wall thereof, and after torsion element 28 is assembled with U-shaped end portions 22 and 24, as shown in Fig. 3, tongues 33 and 35, stuck from the walls of tubular legs 23 and 25, respectively, are forced into apertures 30 and 31, as indicated in Figs. 4, 5 and 6. The tongues not only hold element 28 in fixed axial position within the tubular legs, but they also key the ends of the element within the sockets and prevent rotational movement of these ends with respect to the legs and their associated U-shaped end portions.

Figure 8:
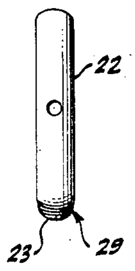
Fig. 8 is an end view of the frame taken on line 8—8 of Fig. 3.
Figure 9:
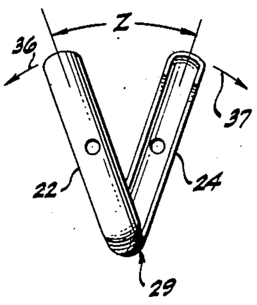
Figs. 9 and 10 are end views similar to Fig. 8 showing relative angular displacement of the U-shaped end portions.
Figure 10:
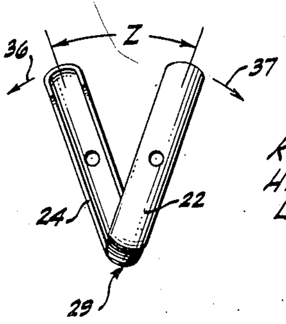

In normal assembled relationship, U-shaped end portions 22 and 24 of frame 20 are positioned in the same plane, a condition clearly indicated by Figs. 3 and 8; however, because of the unique construction of medial portion 29 and the physical characteristics of torsion element 28, end portions 22 and 24 can be angularly displaced from their normal coplanar relationship about the longitudinal axis of the medial portion as indicated by reference character Z shown in Figs. 9 and 10. In other words, if twisting forces of relatively small magnitude are applied to end portions 22 and 24 in the directions designated by arrows 36 and 37 the end portions will become angularly displaced with respect to each other about axis 26 of medial portion 29 without distorting the shape of the end portions and without bending the medial portion. Furthermore, when such twisting forces are discontinued, the resiliency of torsion element 28 becomes a force tending to return end portions 22 and 24 to their normal coplanar relationship.

Another novel feature of the medial portion of frame 20 resides in the fact that element 28 is supported along substantially all of its length by extended legs 23 and 25, a condition which permits the wall of element 28 to be thin as compared to the wall of the legs; moreover, the clearance between the outer cylindrical surface of the tube comprising element 28 and the inner cylindrical surfaces of extended legs 23 and 25 is maintained at a minimum at all times. This latter condition, resulting from the imperceptible change in the diameter of the tube during its torsional deformation, provides a structure interconnecting U-shaped end portions 22 and 24 that is free of undesirable looseness or play.

The amount of relative angular displacement between U-shaped end portions 22 and 24 is limited by the space separating the free ends of tubular legs 23 and 25. This space, indicated by reference numeral 38 in Figs. 4 and 6, is predetermined by several obviously variable factors which are easily controlled. After the frame is assembled, space 38 is at its selected maximum when the U-shaped end portions are in their normal coplanar position (Figs. 3 and 8), but is reduced to zero when end portions 22 and 24 have attained the desired angular displacement as represented by Figs. 9 and 10. The reason for the foregoing condition lies in the fact that the distance between apertures 30 and 31 measured along the axis of element 28 is shortened in proportion to the amount of torsional deformation produced by the twisting forces applied to the ends of the split tube comprising the torsion element; consequently, when end portions 22 and 24 of assembled frame 20 are angularly displaced a predetermined amount about axis 26, the free ends of tubular legs 23 and 25 move into abutment to effect an axial stop against further angular displacement.

Figure 12:
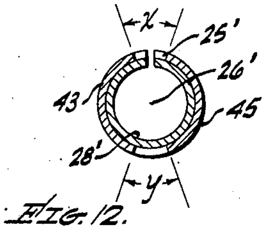
Fig. 12 is a sectional view taken on line 12—12 of Fig. 11.
Figure 11:
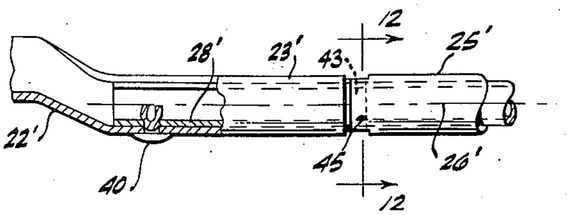
Fig. 11 is a fragmentary view partly in section and partly in elevation showing a modification of the medial portion in Fig. 4.

Another means of holding U-shaped end portions 22 and 24 in assembled relationship with torsion element 28 appears in Fig. 11, where the end of the split tube comprising element 28' is secured within the socket of extended tubular leg 23' by means of a rivet 40, preferably of the explosive type, which is passed through holes provided as shown. In addition to the holding means, Fig. 11 also illustrates a radial stop wherein lugs 43 and 45, formed on the free ends of tubular legs 23' and 25', respectively, are segments of the cylindrical tubes comprising the legs, which segments are dimensioned to permit a predetermined amount of angular displacement of leg 23' with respect to leg 25' about an axis 26' before opposing radial surfaces of lugs 43 and 45 strike each other. This structural relationship is illustrated in Fig. 12, where angles X and Y indicate the amount of angular displacement permitted before lug 43 strikes lug 45 when the U-shaped end portions and their respective legs 23' and 25' are moved in opposite directions about axis 26'.

The need for relative angular displacement of the U-shaped end portions of frame 20, and the importance of limiting such displacement are demonstrated by the twisted condition of chute A' in Fig. 20. This figure schematically illustrates a series of chute-forming links, representative of link B in Fig. 2, which are arranged in tandem to form an ammunition chute having a passageway with a 180 degree twist. With chute A' in this twisted condition, there are incremental angular displacements of the U-shaped end portions of the links from their normal coplanar relationship, which displacements reach a maximum angle Z at the 90 degree point of the twist, as indicated by link B. In view of the displacement limiting characteristics of the medial portion, previously described, the magnitude of angle Z is within the allowable limits to ensure unimpeded progress, through the twisted passageway, of an ammunition belt comprising cartridges of the character of cartridge E in Fig. 2.

Having described the novel features involved in frame 20 of the chute-forming link B, attention is now directed to the structure and operation of connectors C which are employed for connecting the links in chute-forming relationship, and which are particularly adapted to permit a limited amount of separation between adjacent links, as shown in Fig. 1, to meet the bend requirements suggested by chutes A' in Figs. 21 and 22.

Figure 13:
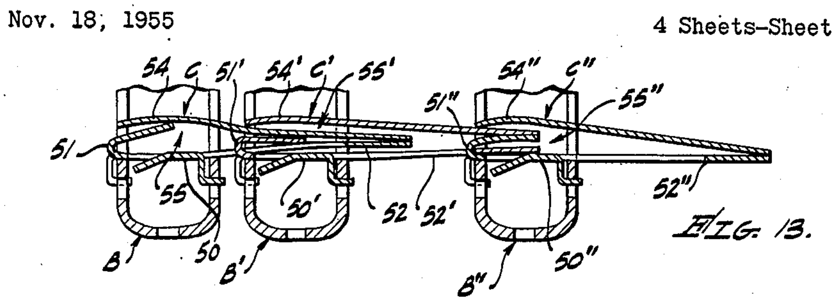
Fig. 13 is an enlarged fragmentary view taken on line 13—13 of Fig. 1.
Figure 14:
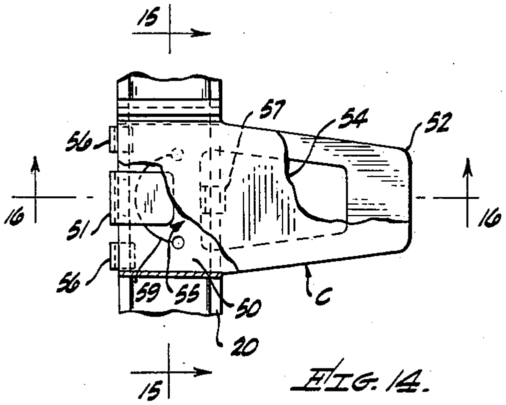
Fig. 14 is a plan view of one of the removable connectors.
Figure 15:
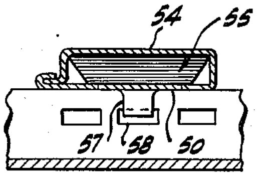
Fig. 15 is a sectional view taken on line 15—15 of Fig. 14.

Turning now to Fig. 13; the view shown is a partial cross section through links B, B' and B'' taken along line 13—13 of Fig. 1 for the purpose of showing the tandem relationship of a plurality of interconnected connectors of the type identified as C, C' and C''. These connectors are substantially identical self-contained units each of which includes a coupling plate 50, having at one end a hook 51 and at the other end an eye or loop 52 adapted to engage the hook of another connector, and an apron plate 54 attached to the coupling plate in a manner such as to overlie the loop and provide an open ended box 55 around the hook as illustrated in Figs. 13, 14, 15 and 16.

Figure 16:
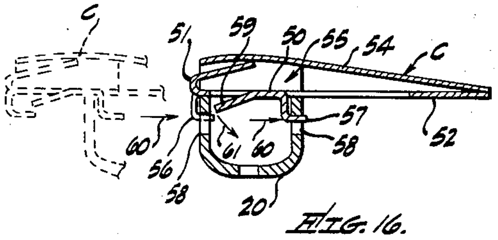
Fig. 16 is a sectional view taken on line 16—16 of Fig. 14.
Figure 17:
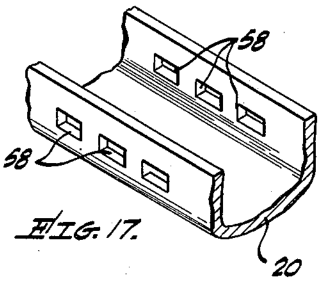
Fig. 17 is a perspective view of a fragment of the frame.

An important characteristic of connectors C resides in the fact that they are removably attached to frame 20 of the chute-forming links. This attachment is accomplished as a result of alignment hooks 56 and 57 which are formed from the body of plate 50 and are adapted to enter slots 58, pierced through the flanges (see Fig. 17) of frame 20, while the bottom of plate 50 is in contact with the top edges of the flanges. Once hooks 56 and 57 have fully entered slots 58, a tab or detent 59, downwardly projecting from the body of plate 50, is provided to engage one of the frame flanges to prevent withdrawal of hooks 56 and 57 from their respective slots. The mode of attaching connector C to frame 20 is illustrated in Fig. 16 where the connector, shown in attached position, has been moved in the direction indicated by arrows 60 from the position shown by dotted lines. Since connectors C are preferably made of bendable resilient material, tab 59 automatically snaps downward in the direction of arrow 61 to the position shown in Fig. 16 for cooperation with hooks 56 and 57 to hold the connector in position as determined by the location of slots 58 in the flanges of the frame.

Removal of connector C from frame 20 can be achieved by forcing tab 59 in a direction opposite to that indicated by arrow 61 so that the end of the tab avoids the flange of frame 20 as the connector is moved in a direction opposite to that indicated by arrows 60. It is to be noted in Fig. 17, that both flanges are provided with an equal number of slots 58; hence connector C may be attached from either side of the frame. This construction provides a distinct manufacturing advantage, because identical frames and connectors can be assembled in either direction to provide both right and left hand chute-forming links; thus ammunition chutes constructed of the same elements can be provided for feeding guns from either the right or the left hand side to meet gun-installation requirements.

Figure 18:
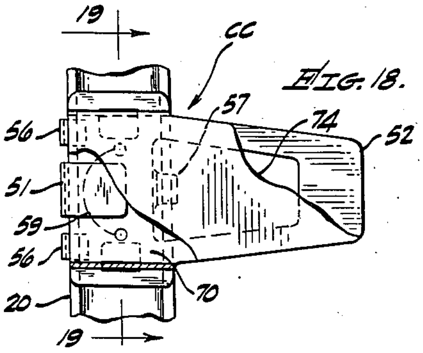
Fig. 18 is a modification of the connector shown in Fig. 14.
Figure 19:
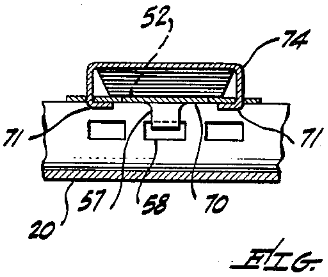
Fig. 19 is a sectional view taken on line 19—19 of Fig. 18.

Although connector C, as illustrated, is made of a single piece of relatively thin, bendable, resilient sheet material, its structure may be altered as suggested by connector CC in Figs. 18 and 19 where apron plate 74 is a separately made element attached to a coupling plate 70 by suitable means such as tabs 71 which, being integral parts of apron 74, are passed through apertures in plate 70 and then clinched, as shown in Fig. 19. One advantage of connector CC lies in the fact that coupling and apron plates 70 and 74 may be constructed of material having different physical properties and/or different thicknesses to provide connectors with special characteristics.

The attachment of connector CC to frame 20, and the removal therefrom are the same as those previously described for connector C. Moreover, the tandem interconnections between a plurality of connectors CC are identical to such interconnections between connectors C as shown in Fig. 13; thus it follows that an ammunition chute may be constructed with chute-forming links having either or both types of connectors.

The manner in which connectors C and CC co-operate with connectors of their own type or with each other to provide an ammunition chute with flexibility such that the chute is capable of being twisted and curved, as suggested in Figs. 20, 21 and 22, is also illustrated in Fig. 13, where links B and B' and links B' and B'' are respectively positioned minimum and maximum distances apart to simulate the coupled relationship of the connectors involved in the turns of chute A' shown in Figs. 21 and 22.

In the spaced relationship of links B and B', loop 52 and that portion of apron plate 54, which overlies loop 52, extend through both open ends of box 55' of connector C', and in the spaced relationship of links B' and B'' loop 52' and apron plate 54' have been withdrawn from box 55'' of connector C'' to the extent that the end of loop 52' is engaged by hook 51''. In the case of links B and B', apron plate 54' of connector C' overlaps apron plate 54 of connector C, and in the case of links B' and B'', apron plate 54'' of connector C'' overlaps apron plate 54' of connector C'. Inasmuch as the foregoing relationships are typical of all the interconnected connectors involved in an ammunition chute comprising chute-forming links B, it is now apparent that connectors C or CC not only provide the means for expansively coupling these links so as to form a flexible chute, but they also provide imbricated or overlapped surfaces within the chute passageway for guiding the belt of ammunition.

Although ammunition chutes have been constructed with chute-forming links having connectors associated with overlying plates adapted to act as guiding surfaces within the chute passageway, the overlying relationship of these connectors and guide-surface plates is the result of assembling these elements to the frame of the chute-forming links; while in the present invention, the connectors and the guide-surface plates are consolidated into composite units which can be manually attached and detached to and from the frame without the use of special tools or equipment.

What is claimed as new is:

1. A series of chute-forming elements flexibly interconnected to form an adjustable chute having a member-guiding passageway, each of said elements comprising: a frame shaped to determine the general cross-sectional configuration of the passageway, said frame including a pair of end portions and a medial portion with a longitudinal central axis interconnecting the end portions in spaced and normally coplanar relationship, said medial portion being characterized by axial torsional resilience and substantial transverse rigidity to permit relative angular displacement of the end portions about the central axis without bending the end and medial portions of the frame when twisting forces are applied to said end portions, said resilience being effective for returning the end portions to their normal coplanar relationship upon discontinuance of the twisting forces; readily detachable first means mounted on the end portions of said frame and adapted for flexibly interconnecting the chute-forming elements in chute-forming relationship; and second means overlying said first means and adapted to form overlapping guiding surfaces within the passageway.

2. The chute-forming element defined in claim 1 in which the medial portion of the frame includes a torsionally resilient instrumentality having a longitudinal central axis coextensive with the central axis of said medial portion, and means adapted to limit the relative angular displacement of the end portions about the central axis.

3. The chute-forming element defined in claim 1 in which the medial portion of the frame includes a tubular element conditioned for torsional resilience about its central axis.

4. The chute-forming element defined in claim 1 in which the medial portion of the frame includes a tubular element of resilient material having a longitudinally split wall.

5. The chute-forming element defined in claim 1 in which the medial portion of the frame comprises: tubular means conditioned to provide torsional resilience about its longitudinal axis; connecting means associated with the end portions of the frame, said connecting means being adapted to hold the extreme ends of said tubular means and prevent said ends from rotating with respect to said connecting means when twisting forces are applied to the end portions of the frame.

6. The chute-forming element defined in claim 5 in which the tubular means comprises a tubular element of resilient material having a longitudinally split wall; and in which the connecting means comprises tubular sockets rigidly attached to the end portions of the frame, said sockets being adapted to telescopically receive said tubular element and to hold the extreme ends thereof and prevent said ends from rotating within said sockets.

7. A series of chute-forming links transversely interconnected to form a flexible chute having a member-guiding passageway, each of said links including a frame comprising: a pair of substantially U-shaped end elements; and a transversely rigid connection, having a longitudinal central axis, interconnecting said end elements in spaced and normally coplanar relationship with the open portions of the U-shaped elements facing each other, said connection including a torsion member conditioned for axial torsional resilience to permit relative angular displacement between the U-shaped end elements about the central axis of said connection in response to twisting forces applied to said end elements and to return these elements to their normal coplanar relationship upon discontinuance of said twisting forces.

8. The frame defined in claim 7 in which the connection interconnecting the end elements is provided with limiting means associated with the central axis and adapted to prevent the relative angular displacement between the end elements from exceeding a predetermined amount.

9. A series of chute-forming links transversely interconnected to form a flexible chute having a member-guiding passageway, each of said links including a pair of substantially U-shaped end elements and means interconnecting these end elements in spaced and normally coplanar relationship with the open portions of the end elements facing each other, said means comprising: a connecting member having a longitudinal central axis and opposite end portions attached to opposing legs of the U-shaped elements, said member being conditioned for axial torsional resilience to permit relative angular displacement between the U-shaped end elements about the longitudinal central axis in response to twisting forces applied to the end elements of the link, and to return these elements to their normal coplanar relationship upon discontinuance of said twisting forces.

10. A series of chute-forming elements flexibly interconnected to form an adjustable chute having a member-guiding passageway, each of said elements including a frame shaped to determine the general cross-sectional configuration of the passageway, and a plurality of readily removable unitary connectors positioned at selected intervals around the frame for connecting the elements in chute-forming relationship and for providing imbricated guiding surfaces in the passageway, each of said connectors comprising: a coupling plate characterized by hook and hook-engaging end portions constructed and arranged such that the hook end portion of one coupling plate is engageable with the hook-engaging end portion of another plate, by positioning means adapted to slidably engage apertured portions of the frame of the chute-forming element, and by a bendable detent normally conditioned to coact with said frame for preventing unintentional removal of each connector from the frame; and an imbricate-surface-forming element fixedly associated with the coupling plate in overlying relationship with respect to the hook and hook-engaging end portions of said plate for forming the guiding surfaces in the member-guiding passageway.

11. A chute-forming link of the character adapted for connection in multiples to form an adjustable chute having a passageway for guiding cartridges arranged in belt formation, said chute-forming link comprising: a frame including a pair of end sections and a medial section having a longitudinal central axis interconnecting the end sections in spaced and normally coplanar relationship, said medial section being characterized by axial torsional resilience and transverse rigidity to permit relative angular displacement of the end sections without bending the end and medial sections of the frame when twisting forces are applied to said end sections, said resilience being effective for returning the end sections to their normal coplanar relationship upon discontinuance of the twisting forces, and said frame being effective for establishing the general cross-sectional configuration of the cartridge-guiding passageway; a plurality of readily detachable connectors mounted on the end sections of the frame for connecting one frame to another in chute-forming relationship, each of said connectors being provided with hook and hook-engaging portions constructed and arranged to permit the hook portion of one connector to engage the hook-engaging portion of another connector, with alignment means adapted to slidably engage apertured portions of the frame end sections, with a releasable detent conditioned to coact with the end sections for preventing unintentional removal of the connector from the frame, and with an overlying surface-forming element adapted to form the guiding surfaces of the cartridge guiding passageway.

12. The chute-forming link defined in claim 11 in which the medial section includes means associated with the central axis adapted to limit the relative angular displacement of the end sections.

References Cited in the file of this patent

UNITED STATES PATENTS 2,510,191 Nobles ---------------- June 6, 1950